Patented June 25, 1940

2,205,552

UNITED STATES PATENT OFFICE 2,205,552

METHOD OF PRESERVING THE CATALYTIC ACTIVITY OF A METALLIC NICKEL HYDROGENATION CATALYST

Herrick R. Arnold, Wilmington, Del., assignor to E. I. du Pont de Nemours & Company, Wilmington, Del., a corporation of Delaware No Drawing. Application July 3, 1937, Serial No. 151,845

7 Claims. (Cl. 23—236)

This invention relates to a method of preserving the activity of a metallic nickel hydrogenation catalyst during periods of non-use.

It is well known that metallic nickel when prepared in a catalytically active form is highly sensitive to oxidation, becoming pyrophoric and oxidizing rapidly on exposure to an oxygen-containing atmosphere, thereby losing its catalytic activity. The problem of handling, storing, and transporting active nickel catalyst, while preventing it from losing its activity, is therefore an important one. Also it is well known that in a hydrogenation process it often becomes desirable to discontinue the reaction and recover the catalyst, storing it for a period of time before reuse. The problem of preserving the activity of the catalyst during this period of storage is likewise important.

Many methods for stabilizing and/or preserving such catalysts have been disclosed. Probably the most widely used method is the one in which the freshly prepared catalyst is transferred directly and without exposure to an oxidizing agent into an inert medium such as carbon dioxide or nitrogen, water, or an oil which is to be hydrogenated such as cottonseed oil, or frequently the liquid or solid product of hydrogenation such as hydrogenated cottonseed oil. All these materials possess certain disadvantages. Handling of the catalyst in a gaseous medium is difficult to do without admitting some air. Water at best only reduces the rate of deterioration and does not prevent it altogether. Frequently the material to be hydrogenated such as, for example, an unsaturated fatty acid reacts chemically with the catalyst destroying its activity, while the use of the hydrogenation product as a protective medium is open to several objections among which is its diluting effect on the catalyst with consequent lowering of space-time yields.

Another method involves stabilizing the catalyst, and rendering it relatively insensitive to oxidation, by exposing it in its freshly reduced state to an inert gas containing very small concentrations of air or oxygen. This treatment destroys the most active surface points by superficial oxidation, thus reducing its pyrophoric character making it less sensitive to oxidation. This treatment, however, materially reduces the activity of the catalyst.

This invention has as its object to provide an improved method of retaining the activity of a nickel catalyst during periods of non-use. Another object is to provide a method for storing, handling, and transporting a freshly prepared nickel catalyst. Still another object is to provide a method by which a nickel catalyst may be reused intermittently during a period of time. Another object is an improved method for treating nickel catalysts for use in the preparation of sugar amines. A still further object is an improved method for treating a nickel catalyst prior to use in a process of catalytically hydrogenating glucose-methylamine mixtures to methyl glucamine. A further object is to provide an improved method for treating freshly prepared nickel catalysts whereby they may be preserved indefinitely, not only without diminishment of their original activity, but in most cases actually increasing their activity. Other objects will appear hereinafter.

These objects are accomplished by a method which comprises maintaining said catalyst in a wet condition with a solution of a substance selected from the group consisting of lower alkyl amines and ammonia during the period that the catalyst is not used in a catalytic hydrogenation reaction.

The manner in which this invention is accomplished is set forth in the following examples which are intended to illustrate, but in no way to limit, the scope of the invention as set forth in the appended claims.

Example 1

A nickel catalyst was prepared as follows: Thirty gallons of nickel nitrate containing the equivalent of 10.8 pounds of nickel was mixed with 16.6 pounds of kieselguhr and a solution consisting of 49.5 pounds of sodium bicarbonate and 95 gallons of water was added at room temperature with constant stirring. Continuing the agitation, the slurry was heated to 80° to 85° C. and held at this temperature for two hours after which the precipitate, consisting of basic nickel carbonate-on-kieselguhr, was washed by decantation, filtered, dried, and screened through a 60-mesh screen.

Two ten gram samples of the basic nickel carbonate-on-kieselguhr, prepared as described, were reduced to active nickel-on-kieselguhr under identical conditions by heating at 480° C. for 1.75 hours in a stream of hydrogen, after which the reduced samples were cooled to room temperature in hydrogen and then discharged directly, without exposure to air, from the reduction chamber into receivers each containing 25 grams of 50% aqueous methylamine solution.

One reduced sample so prepared was tested immediately after reduction for the hydrogenation of a mixture of glucose and methylamine to methylglucamine. The other sample was stored in the 50% methylamine solution for 75 hours before testing it under identical conditions, for the same reaction.

Hydrogenation of the glucose-methylamine mixture to methylglucamine was carried out as follows: To a solution containing 99 grams of glucose and 93 grams of 50% aqueous methylamine solution was added a sample of the reduced catalyst-methylamine paste. The mixture was placed in an agitating autoclave and heated at 85° C. under 1000 lbs. per sq. in. hydrogen pressure until hydrogen absorption ceased. It was found that the reduced catalyst placed in 50% methylamine solution and tested at once (i. e., within one hour) gave a conversion of glucose to methylglucamine of 75%, and the catalyst stored in a similar solution for 75 hours gave a conversion of 77.5% indicating definitely that deterioration had not only been prevented but that the activity of the catalyst had actually increased slightly when kept in contact with aqueous solutions of methylamine for prolonged periods of time.

Similarly, catalysts reduced and stored in 5% aqueous methylamine solutions instead of 50% solution showed increased activity after standing for as long as 75 hours, such catalysts giving in repeated tests as high as 79% conversions.

By way of contrast, four ten-gram samples of nickel carbonate-on-kieselguhr prepared and reduced as described above, were discharged directly into 25 grams of boiled distilled water. These samples, after standing in water for varying periods of time were tested exactly as described above for the hydrogenation of glucose-methylamine mixtures to methylglucamine, with the following results:

| Sample | Time stored in H$_2$O | Time required for hydrogenation | Percent conversion |
|---|---|---|---|
| | Hours | Minutes | |
| 1 | 1 | 30 | 71.2 |
| 2 | 24 | 40 | 37.1 |
| 3 | 48 | 60 | 43.0 |
| 4 | 72 | 75 | 0.0 |

Further demonstration of the advantage of methylamine solutions over inert gaseous media as preservative agents for nickel catalysts is shown by the fact that nickel catalysts precipitated and reduced as described above, and sealed in an atmosphere of carbon dioxide gave 80% conversion of glucose-methylamine mixtures to methylglucamine when tested within one hour after reduction, but less than 5% conversion when tested after being stored for one week in carbon dioxide.

The following table, summarizing the data presented above, clearly demonstrates that methylamine solutions are not only superior to other media in their preservative action on nickel catalysts, but that they actually effect a certain increase in the activity of these catalysts.

| Catalyst | Preservative medium | Time of storage | Percent conversion of glucose-methylamine to methylglucamine |
|---|---|---|---|
| | | | Percent |
| 1 | 50% Me amine | 1 hr | 75 |
| 2 | do | 65 hrs | 77 |
| 3 | 5% Me amine | 1 hr | 75 |
| 4 | do | 75 hrs | 79 |
| 5 | Boiled water | 1 hr | 71 |
| 6 | do | 72 hrs | 0 |
| 7 | CO$_2$ | 1 hr | 80 |
| 8 | CO$_2$ | 1 week | <5 |

*Example 2*

A nickel catalyst was prepared from a finely powdered alloy consisting of 50% by weight of each of the metals nickel and aluminum by dissolving out the aluminum by extraction with hot caustic solution according to the method disclosed in U. S. Patents Nos. 1,563,587, 1,628,190, 1,915,473 granted to Murray Raney. After thoroughly washing the nickel sludge with water until free from alkalis, several ten-gram samples of the nickel were suspended in 25 grams of 25% aqueous methylamine, stored for periods varying from one hour to 115 hours, and tested for the hydrogenation of mixtures of glucose and methylamine to methylglucamine as described in Example 1 above.

That no deterioration of the catalyst occurred during storage in the methylamine solutions was indicated by the fact that the sample stored for 115 hours gave 86% and 86.6% conversions, respectively, as compared with 86% conversion obtained with the sample stored for only one hour.

Certain specific embodiments of the invention have been set forth in the above examples, but the scope of the invention is not limited by these.

In the practice of this invention any lower alkyl amine may be used; it is preferred, however, to employ those lower alkyl amines which are water soluble. The preferred preservative media are dilute aqueous solutions of mono-methyl, dimethyl, or trimethylamines. Other alkyl amines such as ethyl or butylamines, or ammonia may be used but there is no particular advantage to be gained by using them instead of the methylamines.

Although this preservative treatment may be applied to catalysts destined for use in a wide variety of hydrogenation reactions, it is particularly efficacious in hydrogenations carried out in an alkaline system such as for example the hydrogenation of glucose and ammonia to glucamine.

The alkaline preservative agents embodied in this invention are applicable to the preservation of metallic nickel catalysts in general, and are independent of the method by which the catalyst is prepared.

These agents are preferably used in aqueous solution, although where water is incompatible with the material to be hydrogenated or for any other reason is undesirable, other solvents for the lower alkyl amines or ammonia which, though inert toward the catalyst are capable of wetting it, may be used; e. g., alcohols, dioxane, etc.

The concentration of the alkylamine solutions used as preservative media may be as high as 50% or more. It is unnecessary, however, to use concentrations greater than 5%, and in most cases 3% to 5% solutions not only give effective preservation but actually increase the activity of the catalyst slightly above its original activity. Generally, the concentration of the alkylamine solutions used as preservative media should not be less than about 1%.

The amount of amine solution in any given case and of whatever concentration need be no more than is necessary to wet the catalyst thoroughly. Ordinarily, it is preferable to use just enough solution to form a thick moist paste with the catalyst.

It is of course desirable to store the catalyst paste in a closed container to avoid evaporation of the preservation agent.

In place of the glucose of the examples other hydroxy carbonyl compounds which may be used include erythrose, ribose, arabinose, xylose, rhamnose, fructose, mannose, gulose, lactose, sorbose, etc.

Other amines for reacting with the hydroxy carbonyl compounds which may be used in place of the methylamine of the examples include diethylamine, mono-n-propylamine, mono-iso-propylamine, di-isopropylamine, di-n-butylamine, octadecylamine, dodecylamine, benzylamine, etc.

The principal advantage of this invention is the provision of a simple, economical, and practical process for preserving highly active nickel catalysts without loss of catalytic activity. Other advantages are also apparent such as the elimination of the hazards involved in handling and transporting in the dry state of pyrophoric catalysts which are likely to generate heat and cause fires or explosions if exposed to air or oxygen to the slightest degree.

It is apparent that many widely different embodiments of this invention may be made without departing from the spirit and scope thereof and therefore it is not intended to be limited except as indicated in the appended claims.

I claim:

1. A process of maintaining the activity of a nickel catalyst during storage prior to use, which comprises maintaining said catalyst in a wet condition with a solution of a substance selected from the group consisting of the lower alkyl amines and ammonia.

2. A process of preserving the activity of a nickel catalyst during a period of non-use, which comprises wetting said catalyst with a solution of a substance selected from the group consisting of the lower alkyl amines and ammonia and storing said catalyst in the wet condition during the period of non-use.

3. The process in accordance with claim 2 characterized in that the solution is an aqueous methylamine solution.

4. The process in accordance with claim 2 characterized in that the aqueous solution is a methylamine solution containing methylamine in an amount equivalent to about 3 to about 5% by weight of said solution.

5. The process in accordance with claim 2 characterized in that the solution is present in an amount sufficient to form a thick moist paste with the catalyst.

6. The process in accordance with claim 2 characterized in that the nickel catalyst is a freshly prepared nickel catalyst.

7. In the process of preserving a nickel catalyst which has previously been used in the preparation of sugar amines, the step which comprises maintaining said catalyst in a wet condition by contact with a solution of a substance selected from the group consisting of ammonia and the lower alkyl amines.

HERRICK R. ARNOLD.